US006417266B1

United States Patent
Terado et al.

(10) Patent No.: US 6,417,266 B1
(45) Date of Patent: Jul. 9, 2002

(54) PROCESS FOR PREPARING ALIPHATIC POLYESTER

(75) Inventors: Yuji Terado, Fukuoka; Hiroshi Suizu, Tokyo; Masatoshi Takagi, Chiba; Masanobu Ajioka, Fukuoka; Shoji Hiraoka; Masayuki Sakai, both of Yamaguchi; Hiroyuki Suzuki, Fukuoka; Hiroshi Kimura, Chiba; Shinji Ogawa; Yasushi Kotaki, both of Fukuoka, all of (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/786,763

(22) PCT Filed: Jul. 10, 2000

(86) PCT No.: PCT/JP00/04560

§ 371 (c)(1),
(2), (4) Date: Mar. 9, 2001

(87) PCT Pub. No.: WO01/04175

PCT Pub. Date: Jan. 18, 2001

(30) Foreign Application Priority Data

Jul. 9, 1999 (JP) .......................................... 11-196133

(51) Int. Cl.[7] .......................... C08K 5/41; C08G 63/82
(52) U.S. Cl. ...................... 524/745; 528/272; 528/274; 528/481; 528/487; 528/503
(58) Field of Search ................................. 528/272, 274, 528/481, 487, 503; 524/745

(56) References Cited

U.S. PATENT DOCUMENTS 6,140,458 A * 10/2000 Tsrado et al. ............... 528/272

FOREIGN PATENT DOCUMENTS

| JP | 8-34843 | 2/1996 |
| JP | 11-80332 | 3/1999 |

* cited by examiner

Primary Examiner—Samuel A. Acquah
(74) Attorney, Agent, or Firm—Burns, Doane, Swecker & Mathis, L.L.P.

(57) ABSTRACT

A process for producing aliphatic polyester wherein a crystallized aliphatic polyester prepolymer formed from an aliphatic dihydric alcohol and an aliphatic dicarboxylic acid and having a weight-average molecular weight of 2,000 to 100,000 is caused to undergo solid-phase polymerization in the presence of a volatile catalyst to make an aliphatic polyester having a weight-average molecular weight of 50,000 to 1,000,000. This process is more efficient than any prior process calling for a complicated step for catalyst removal, since it enables the removal of the catalyst from the reaction system during and/or after solid-phase polymerization. The polyester is comparable in stability to any aliphatic polyester having any catalyst removed therefrom.

14 Claims, No Drawings

PROCESS FOR PREPARING ALIPHATIC POLYESTER

TECHNICAL FIELD

This invention relates to a process for preparing an aliphatic polyester, which is a biodegradable polymer useful as a substitute for any general-purpose resin, from an aliphatic dihydric alcohol and an aliphatic dicarboxylic acid by solid-phase polymerization in the presence of a non-metallic volatile catalyst. More particularly, it relates to a process which can manufacture an aliphatic polyester of high stability by using a non-metallic volatile catalyst and without employing any special step for its removal.

BACKGROUND ART

The disposal of waste matter has recently come to be discussed in conjunction with the protection of the environment. If molded or processed products of general-purpose high molecular materials are buried as waste matter, there arise problems, as they are not degradable by microorganisms, etc., but remain semi-permanently as foreign matter in the environment, while the dissolution of additives, such as a plasticizer, therefrom causes the pollution of the environment.

It has also been pointed out that if they are incinerated as waste matter, a large amount of heat produced by their combustion damages the incinerator, and that the smoke and gases resulting from their combustion may cause air pollution, the destruction of the ozone layer, global warming, acid rain, etc.

Under these circumstances, polyhydroxycarboxylic acids such as polylactic acid, polyglycolic acid, poly-3-hydroxybutyric acid and polycaprolactone, and aliphatic polyesters such as polyethylene succinate, polybutylene succinate and polyethylene adipate have recently come to draw a great deal of attention for research and development activities.

As regards the aliphatic polyesters, there are a process in which an aliphatic polyester having a high molecular weight is obtained by reacting a diisocyanate with the ends of a polymer in the molten state, as disclosed in Japanese Patent Appln. Laid-Open No. 189822/1992 or 189823/1992, and a process in which an aliphatic polyester having a high molecular weight is obtained by a dehydration condensation reaction using an organic solvent without using any diisocyanate, as disclosed in U.S. Pat. No. 5,401,796.

There is also known a process for preparing an aliphatic polyester by solid-phase polymerization. Japanese Patent Appln. Laid-Open No. 34843/1996 discloses a process in which an aliphatic polyester having a high molecular weight is produced by crystallizing an aliphatic polyester having a relative viscosity of 1.5 or above and subjecting it to solid-phase polymerization at a temperature lower than its melting point in an inert gas atmosphere, or at a reduced pressure.

The catalyst disclosed therein is a compound of a metal such as titanium, germanium, antimony, magnesium, calcium, zinc, iron, zirconium, vanadium, lithium, cobalt or manganese, and is used in the form of a metal alkoxide, acetylacetonate, oxide, complex or hydroxide, an organic acid salt, etc. There is no statement teaching the use of any non-metallic volatile catalyst in the form of an organic sulfonic acid type compound.

It is known that if metallic catalyst remains active in a polyester, the polyester has its molecular weight lowered by heat during a molding process, and is not satisfactory in moldability or heat resistance. In order to ensure the stability of a polyester, therefore, it is usual practice to add a catalyst deactivator, such as phosphoric or phosphorous acid, or a polymer stabilizer to deactivate the catalyst in a polyester, or remove the catalyst from the polyester in case of using a metallic catalyst.

Any such additive is easy to add to a polyester in a polymerization system if it is made by solution or melt polymerization, but if it is made by a solid-phase process, an additional step is required for melting a solid polymer before adding any such additive to it, and complicates the process. In either event, there is undesirably obtained a polyester containing any such additive, and a deactivated catalyst.

The removal of the catalyst is preferable to the addition of any additive in that no undesirable material remains in the polyester, but requires operation and equipment differing entirely from those employed for polymerization, and thereby adds a step complicating the preparation process of the polyester.

It is, therefore, an object of this invention to provide a process which makes it possible to prepare an aliphatic polyester of high stability from an aliphatic dihydric alcohol and an aliphatic dicarboxylic acid without requiring any special step for catalyst removal.

DISCLOSURE OF THE INVENTION

We, the inventors of this invention, have made a careful study of the problems as pointed out above in connection with the prior art, and found that an aliphatic polyester of high stability can be made from an aliphatic dihydric alcohol and an aliphatic dicarboxylic acid without requiring any special step for catalyst removal if it is made by solid-phase polymerization using a volatile catalyst.

Thus, the process of this invention is defined according to [1] to [8] below.

[1] A process for preparing an aliphatic polyester, wherein a crystallized aliphatic polyester prepolymer formed from an aliphatic dihydric alcohol and an aliphatic dicarboxylic acid and having a weight-average molecular weight ($Mw_1$) falling within the range defined by a formula (1) is caused to undergo solid-phase polymerization in the presence of a volatile catalyst to make an aliphatic polyester having a weight-average molecular weight ($Mw_2$) falling within the range defined by formulas (2) and (3):

$$2 \times 10^3 \leq Mw_1 \leq 1 \times 10^5 \quad (1)$$

$$5 \times 10^4 \leq Mw_2 \leq 1 \times 10^6 \quad (2)$$

$$Mw_1 < MW_2 \quad (3)$$

[2] A process for preparing an aliphatic polyester according to [1] wherein the residual catalyst percentage R, as defined by a formula (4), is 50% or below:

$$R[\%] = C_A \text{ [ppm]} \div C_B \text{[ppm]} \times 100 \quad (4)$$

wherein R is the residual catalyst percentage [%] as a measure for the difference in catalyst content between before and after the solid-phase polymerization, $C_B$ [ppm] is the theoretical catalyst content of the aliphatic polyester in the case where all of the catalyst introduced into the reaction system before and/or during solid-phase polymerization remains in the polyester, as calculated by a formula (5), and $C_A$ [ppm] is a final catalyst content in the aliphatic polyester calculated by a formula (6);

$$C_B \text{ [ppm]} = W_B \text{ [g]} \div W_P \text{ [g]} \times 10^6 \quad (5)$$

wherein $W_B$ [g] is the total weight of the catalyst introduced into the reaction system before and/or during solid-phase polymerization, and $W_P$ [g] is the final weight of the polyester;

$$C_A \text{ [ppm]} = W_A \text{ [g]} \div W_P \text{ [g]} \times 10^6 \tag{6}$$

wherein $W_A$ [g] is the final weight of the catalyst in the polyester, and $W_P$ [g] is the final weight of the polyester.

[3] A process for preparing an aliphatic polyester according to [1] or [2], wherein the prepolymer is a polybutylene succinate prepolymer formed from succinic acid and 1,4-butanediol, and the polyester is polybutylene succinate.

[4] A process for preparing an aliphatic polyester according to [1] or [2], wherein the volatile catalyst is an organic sulfonic acid.

[5] A process for preparing an aliphatic polyester according to [4], wherein the organic sulfonic acid is at least one compound selected from the group consisting of methanesulfonic, ethanesulfonic, 1-propanesulfonic, benzenesulfonic, p-chlorobenzenesulfonic, and m-xylene-4-sulfonic acids.

[6] A process for preparing an aliphatic polyester according to [4] or [5], wherein the final catalyst content of the aliphatic polyester is from 0 to 300 ppm in terms of the sulfur content.

[7] A process for preparing an aliphatic polyester, comprising the steps of:

(A) forming an aliphatic polyester prepolymer having a weight-average molecular weight ($Mw_1$) falling within the range defined by a formula (1), by polycondensation from an aliphatic dihydric alcohol and an aliphatic dicarboxylic acid in the presence or absence of a catalyst and in the presence or absence of a solvent, $$2 \times 10^3 \leq Mw_1 \leq 1 \times 10^5 \tag{1};$$

(B) crystallizing the prepolymer as obtained by step (A); and (C) causing the prepolymer as crystallized by step (B) to undergo solid-phase polymerization in the presence of a volatile catalyst to make an aliphatic polyester having a weight-average molecular weight ($Mw_2$) falling within the range defined by formulas (2) and (3), $$5 \times 10^4 \leq Mw_2 \leq 1 \times 10^6 \tag{2}$$

$$Mw_1 < Mw_2 \tag{3}$$

[8] A process for preparing an aliphatic polyester according to [7], wherein the aliphatic dihydric alcohol is 1,4-butanediol, the aliphatic dicarboxylic acid is succinic acid, and the volatile catalyst comprises at least one compound selected from the group consisting of methanesulfonic, ethanesulfonic, 1-propanesulfonic, benzenesulfonic, p-chlorobenzenesulfonic, and m-xylene-4-sulfonic acids.

BEST MODE OF CARRYING OUT THE INVENTION

According to the process of this invention, an aliphatic polyester having a weight-average molecular weight ($Mw_2$) falling within the range defined by formulas (2 and (3) is obtained by solid-phase polymerization in the presence of a volatile catalyst from a crystallized aliphatic polyester prepolymer formed from an aliphatic dihydric alcohol and an aliphatic dicarboxylic acid and having a weight-average molecular weight ($Mw_1$) falling within the range defined by a formula (1):

$$2 \times 10^3 \leq Mw_1 \leq 1 \times 10^5 \tag{1}$$

$$5 \times 10^4 \leq Mw_2 \leq 1 \times 10^6 \tag{2}$$

$$Mw_1 < Mw_2 \tag{3}$$

[Definition of the Terms as Herein Used]

(1) Volatile Catalyst

The term "volatile catalyst" as herein used means a catalyst which enables the residual percentage R of the catalyst in an aliphatic polyester made by solid-phase polymerization as defined by a formula (4) to fall within the range defined by a formula (7):

$$R[\%] = C_A \text{ [ppm]} \div C_B \text{[ppm]} \times 100 \tag{4}$$

(where R is the residual catalyst percentage [%] as a measure for the difference in the catalyst content of the polyester between before and after solid-phase polymerization, $C_B$ [ppm] is its theoretical catalyst content in the case where all of the catalyst introduced into the reaction system before and/or during solid-phase polymerization remains in the polyester, as calculated by a formula (5), and $C_A$ [ppm] is its final catalyst content as calculated by a formula (6));

$$C_B \text{ [ppm]} = W_B \text{ [g]} \div W_P \text{ [g]} \times 10^6 \tag{5}$$

(where $W_B$ [g] is the total weight of the catalyst introduced into the reaction system before and/or during solid-phase polymerization, and $W_P$ [g] is the final weight of the polyester);

$$C_A \text{ [ppm]} = W_A \text{ [g]} \div W_P \text{ [g]} \times 10^6 \tag{6}$$

(where $W_A$ [g] is the final weight of the catalyst in the polyester, and $W_P$ [g] is the final weight of the polyester);

$$0[\%] \leq R[\%] < 100[\%] \tag{7}$$

(where R[%] is the residual catalyst percentage [%] calculated by formula (4) as a measure for the difference in the catalyst content of the polyester between before and after solid-phase polymerization).

Thus, the final catalyst content $C_A$ [ppm] of the aliphatic polyester made by solid-phase polymerization using a volatile catalyst according to the process of this invention is lower than its catalyst content $C_B$ [ppm] calculated by formula (5) from the weight of the catalyst introduced into the reaction system before and/or during the solid-phase polymerization.

The lower the residual catalyst percentage R[%], the better the catalyst can be said to be, and the higher the polyester is in stability.

It is generally preferable that the residual catalyst percentage R[%] be 50% or lower, and more preferably 20% or lower, though it may depend on the volatile catalyst and its amount used and the reaction and its conditions employed.

What can be mentioned as an example of such a catalyst may have a vapor pressure at a temperature employed for solid-phase polymerization. Upon solid-phase polymerization in the presence of such a catalyst, an aliphatic polyester prepolymer has a higher molecular weight as a result of polycondensation, and the catalyst volatilizes from the polymer owing to its own vapor pressure and has a lower concentration in the polymer.

(2) Prepolymer

The term "prepolymer" as herein used covers an oligomer or polymer subjected to a polycondensation reaction for solid-phase polymerization.

[Preparation of An Aliphatic Polyester Prepolymer from an Aliphatic Dicarboxylic Acid and an Aliphatic Dihydric Alcohol]

An aliphatic polyester prepolymer formed from an aliphatic dicarboxylic acid and an aliphatic dihydric alcohol for use according to this invention is prepared by a polycondensation reaction from an aliphatic dicarboxylic acid and an aliphatic dihydric alcohol in the presence or absence of a catalyst and in the presence or absence of a solvent.

Any aliphatic dicarboxylic acid can be used without any particular limitation if a crystalline aliphatic polyester prepolymer can be obtained.

Specific examples of the aliphatic dicarboxylic acids which can be employed include aliphatic dicarboxylic acids such as succinic, oxalic, malonic, glutaric, adipic, pimelic, suberic, azelaic and sebacic acids, or undecanoic, dodecanoic and 3,3-dimethylpentanoic diacids, and alicyclic dicarboxylic acids such as cyclohexanedicarboxylic acid. Their anhydrides can also be used. Each acid or anhydride can be used alone, or in combination with another one or ones. Succinic acid is, among others, preferred.

The aliphatic dihydric alcohol having an asymmetric carbon atom in the molecule will include dextrorotatory or levorotatory form, or a racemic mixture, and any such form can be used.

It is also possible to add a small amount of an aliphatic polycarboxylic acid having three or more carboxyl groups, such as 1,2,3,4-butanetetracarboxylic acid, and/or an anhydride thereof.

Any aliphatic dihydric alcohol can be used without any particular limitation if a crystalline aliphatic polyester prepolymer can be obtained.

Specific examples of the aliphatic dihydric alcohols which can be used are ethylene glycol, diethylene glycol, triethylene glycol, propylene glycol, dipropylene glycol, 1,3-butanediol, 1,4-butanediol, 3-methyl-1,5-pentanediol, 1,6-hexanediol, 1,7-heptanediol, 1,8-octanediol, 1,9-nonanediol, neopentyl glycol and 1,4-cyclohexanedimethanol. Each can be used alone, or in combination with another one or ones. Ethylene glycol or 1,4-butanediol is, among others, preferred.

A molecule having an asymmetric carbon atom is dextrorotatory or laevorotatory, or a racemic mixture, and any such form can be used.

It is also possible to add a small amount of an aliphatic polyhydric alcohol having three or more hydroxyl groups, such as trimethylolpropane or pentaerythritol.

For the polycondensation reaction of an aliphatic dicarboxylic acid and an aliphatic dihydric alcohol, there are a solution polymerization process in which their reaction is carried out in an organic solvent, and a melt polymerization process in which their reaction is carried out in the absence of any solvent. An appropriate method is selected in view of the desired weight-average molecular weight (Mw) and the ease of the operation.

The solution polymerization process can be carried out as described, for example, in U.S. Pat. No. 5,401,796.

Referring to the process for preparing an aliphatic polyester prepolymer by melt polymerization, there is no particular limitation, but the polycondensation reaction can be caused to take place in an inert gas atmosphere and/or at a reduced pressure. The reaction temperature is not particularly limited if the monomers in the reaction system (i.e., an aliphatic dicarboxylic acid and an aliphatic dihydric alcohol) and the aliphatic polyester prepolymer formed therefrom are in the molten state so that their polycondensation reaction may proceed, but in view of the speeds of formation and thermal decomposition of the aliphatic polyester, it is preferably in the range of 100° C. to 200° C. and more preferably in the range of 110° C. to 180° C.

The polycondensation reaction in an organic solvent has the advantage of making it easy to prepare a prepolymer having a weight-average molecular weight of 15,000 or higher. The reaction in the absence of any solvent has the advantage of being simple, since no labor is required for removing any organic solvent.

The polycondensation reaction is usually carried out in the presence of a catalyst, though it can also be carried out in the absence of any catalyst.

The catalyst which is used according to this invention is a volatile one which shows a lower concentration in the polymer after solid-phase polymerization than before.

The volatile catalyst is not particularly limited if it is volatile, while substantially promoting the progress of the polycondensation reaction.

Specific examples of the volatile catalyst are organic compounds of the sulfonic acid series.

Specific examples of the organic sulfonic acids are alkanesulfonic acids such as methanesulfonic, ethanesulfonic, 1-propanesulfonic, 1-butanesulfonic, 1-pentanesulfonic, 1-hexanesulfonic, 1-heptanesulfonic, 1-octanesulfonic, 1-nonanesulfonic and 1-decanesulfonic acids, halogenated alkanesulfonic acids such as trifluoromethanesulfonic acid, benzenesulfonic acids and derivatives thereof such as benzenesulfonic, p-toluene-sulfonic, p-xylene-2-sulfonic, m-xylene-4-sulfonic, p-ethylbenzenesulfonic, p-chlorobenzenesulfonic, p-nitrobenzene-sulfonic, o-nitrobenzenesulfonic, p-hydroxybenzenesulfonic and sulfobenzoic acids, and naphthalenesulfonic acids and derivatives thereof such as naphthalene-1-sulfonic, naphthalene-2-sulfonic and 2,5-naphthalenedisulfonic acids. Methanesulfonic, ethanesulfonic, 1-propanesulfonic, benzenesulfonic, p-chlorobenzenesulfonic and m-xylene-4-sulfonic acids are preferred, and methanesulfonic, ethane-sulfonic and 1-propanesulfonic acids are, among others, more preferred. Each acid may be used alone, or in combination with another one or ones.

Some organic sulfonic acids contain water of crystallization, and it is necessary to bear it in mind that such water may sometimes lower the weight-average molecular weight of the polyester. While the catalyst may contain water of crystallization if it is added to a polyester having a weight-average molecular weight (Mw) of 1,000 or lower, such water is preferably removed from the catalyst before it is added to a polyester having a higher molecular weight (Mw), so as not to hinder the progress of the reaction, since an aliphatic polyester having a weight-average molecular weight (Mw) exceeding 1,000 is more likely to have its molecular weight lowered by the water of crystallization in the catalyst with an increase in its molecular weight.

The amount of the volatile catalyst to be used is not particularly limited if it can substantially promote the reaction, though it may depend on the properties of the catalyst itself, including volatility and acid strength, and the reaction conditions.

Although the preferred amount of the catalyst to be used may depend on the catalyst used, it is generally in the range of 0.00005 to 10% by weight of the aliphatic polyester prepolymer, or aliphatic polyester to be prepared, and in view of an economical factor, it is more preferably in the range of 0.001 to 5% by weight and still more preferably in the range of 0.1 to 2% by weight.

The aliphatic polyester prepolymer is not particularly limited in its weight-average molecular weight (Mw) or its molecular weight distribution if it is crystalline and can form an aliphatic polyester having a satisfactorily high molecular weight by solid-phase polymerization, but they can be controlled as desired if the catalyst and its amount and the reaction conditions, such as temperature and time, are appropriately selected. If the prepolymer contains any unreacted aliphatic dicarboxylic acid or aliphatic dihydric alcohol, it is likely that the unreacted monomer may volatilize during solid-phase polymerization, and that the carboxyl and hydroxyl groups reacting with each other may fail to have a proper equivalent ratio to form an aliphatic polyester having a sufficiently high molecular weight for its satisfactorily high mechanical strength. The prepolymer, therefore, preferably has a sufficiently high weight-average molecular weight to be substantially free from any unreacted monomer.

Thus, the prepolymer may have a weight-average molecular weight of from 2,000 to 100,000, preferably from 5,000 to 100,000, more preferably from 6,000 to 100,000, still more preferably from 8,000 to 100,000 and most preferably from 10,000 to 100,000.

Our European Patent No. 0953589A2 discloses a process in which an aliphatic polyester having a weight-average molecular weight of 50,000 to 1,000,000 and containing 50% or more of aliphatic hydroxycarboxylic acid units is produced by solid-phase polymerization in the presence of a catalyst from a crystallized aliphatic polyester prepolymer containing 50% or more of aliphatic hydroxycarboxylic acid units and having a weight-average molecular weight of 2,000 to 100,000. The catalysts disclosed therein include a volatile catalyst such as an organic sulfonic acid compound.

The solid-phase polymerization of an aliphatic polyester prepolymer containing 50% or more of aliphatic hydroxycarboxylic acid units causes its molecular weight to increase mainly owing to the dehydration and polycondensation reaction of the aliphatic hydroxycarboxylic acid units. As an aliphatic hydroxycarboxylic acid, e.g. L-lactic acid, has one hydroxyl and one carboxyl group in its molecule, the equivalent (or molar) ratio of the hydroxyl group and carboxyl group hardly deviates from 1 during the production of an aliphatic polyester by a dehydration and polycondensation reaction.

On the other hands, an aliphatic polyester obtained by the polycondensation reaction of an aliphatic dicarboxylic acid and an aliphatic dihydric alcohol as according to this invention fails to have a high molecular weight if the equivalent ratio of the hydroxyl group and carboxyl group deviates greatly from 1 as a result of, for example, the volatilization of such acid and alcohol. According to this invention, therefore, it is preferable for hydroxyl and carboxyl groups in the aliphatic polyester prepolymer to have their equivalent (or molar) ratio of 0.99 to 1.01 if the prepolymer is polybutylene succinate. Moreover, it is preferable for the prepolymer to be substantially free from any monomeric acid or alcohol, so that the hydroxyl and carboxyl groups in the prepolymer may not have their equivalent ratio deviating greatly from 1 as a result of the volatilization of any such acid or alcohol during the solid-phase polymerization.

[Step of Solidifying the Prepolymer]

The step of solidifying the prepolymer is the step of obtaining a solid prepolymer after the polycondensation reaction of an aliphatic dihydric alcohol and an aliphatic dicarboxylic acid.

Any method can be employed for obtaining a solid prepolymer and its selection depends on the presence of an organic solvent and the crystallinity and amount of the prepolymer.

If any organic solvent is used for the polycondensation reaction, the prepolymer can be solidified by, for example, simply cooling it for crystallization, or removing the solvent by evaporation, or if the amount of the solvent is small (as when the prepolymer has a concentration of 90% or higher), by bringing it into contact with a liquid, while if no solvent is used, the prepolymer can be solidified by, for example, simply cooling it, bringing it into contact with a liquid, or pelletizing it.

Some appropriate treatment is effective to form a solid prepolymer having a desired shape (in the form of, for example, powder, particles, granules or pellets), or a desired particle diameter, as described below.

(1) Method of Preparing a Solid Prepolymer in Powder Form

A prepolymer is crystallized at the end of the process for its preparation, and is separated from an organic solvent, though any other method can also be employed.

(2) Method of Preparing a Solid Prepolymer in the Form of Particles or Pellets

A prepolymer is brought into contact with a liquid in the form of a solution if it is prepared by polycondensation in the presence of a small amount of an organic solvent, or in a molten state if it is prepared without using any solvent, though any other method can also be employed. Any method can be employed for bringing a prepolymer solution or a molten prepolymer into contact with a liquid. If a molten prepolymer is dropped into water, for example, it solidifies into spherical pellets. When a prepolymer is solidified by contact with a liquid, it can be crystallized, while it is kept in contact with the liquid after solidification.

Pellets can also be formed by an extruder, or pelletizer from the product of the polycondensation reaction. Specific examples of the pelletizers which can be employed are a strip or funnel former, and a double roll feeder of Sandvic, a rotary or piston drop former of Kaiser, a drum cooler of Mitsubishi Chemical Engineering, and a steel belt cooler and a hybrid former of Nippon Belding.

A Kaiser's pastillator is a specific example of an apparatus which can be used for forming drops of a prepolymer solution, or a molten prepolymer.

A Sandvic's funnel former can be used to form pellets from even a prepolymer having a relatively low weight-average molecular weight and a relative viscosity which is lower than 1.5. This relative viscosity is the viscosity, as measured by an Ubbelohde's viscometer at 30° C., of a polymer solution prepared by using a mixed solvent consisting of phenol and tetrachloroethane in a weight ratio of 1:1, and having a concentration of 0.5 g/dl.

The pellets, or particles are not particularly limited in shape. They maybe, for example, in crushed, chip, spherical, cylindrical, marble, or tablet form, though a spherical, cylindrical or marble form is usually preferred.

A solid prepolymer may have a particle diameter not particularly limited, but usually selected in view of the ease of handling and the speed of volatilization of a volatile catalyst from the polyester during its solid-phase polymerization.

Its particle diameter is so selected as to ensure, among others, that the catalyst exhibits its volatility thoroughly.

Thus, its particle diameter is preferably from 10 microns to 10 mm, more preferably from 0.1 to 10 mm and still more preferably from 1 to 5 mm in view of its surface area per unit weight of solid polyester which enables it to exhibit its volatility thoroughly.

A catalyst of the kind which is used in solid-phase polymerization can be added during the preparation of a solid prepolymer. The way in which it is added is not particularly limited. It is, however, preferable to distribute the catalyst uniformly in the prepolymer by, for example, adding it when the prepolymer is crushed, or pelletized.

[Step of Crystallizing the Prepolymer]

This is a step of crystallizing a solid prepolymer formed by the step of solidifying the prepolymer.

Any known method can be employed for crystallizing the prepolymer, for example, heating it in a gas phase, such as a hot nitrogen gas atmosphere. And the prepolymer can be crystallized by bringing it into contact with a liquid. A nucleating agent can be added, if required.

There is no specific way in which the prepolymer has to be brought into contact with a liquid. If the prepolymer is a solid, it can, for example, be introduced into a liquid, or the liquid can alternatively be poured over the prepolymer. A tank, or tower can, for example, be employed for introducing the prepolymer into a liquid.

The liquid in a tank may or may not be stirred, but is preferably stirred to preventing the prepolymer particles from contacting one another. If a tower is used, the prepolymer may be caused to contact a liquid flowing in a counter- or co-current relation therewith. It is also possible to introduce the prepolymer into a flowing liquid. The liquid to be poured over the prepolymer may alternatively be sprinkled over it, or circulated through a tower packed with the prepolymer.

Any liquid can be used for crystallizing the prepolymer if it does not dissolve the prepolymer at a crystallizing temperature. It is possible to use a general-purpose solvent, such as water, alcohols, aliphatic hydrocarbons, ketones, ethers or esters. A single liquid, or a mixture may be used. An organic acid can be added to the liquid, if required.

Examples of the alcohols are methanol, ethanol, propanol, iso-propanol, butanol, iso-butanol, sec-butanol, tert-butanol, pentanol, iso-pentanol, tert-pentanol, hexanol, iso-hexanol, tert-hexanol and cyclohexanol. Examples of the aliphatic hydrocarbons are hexane, cyclohexane, n-heptane, n-octane, n-nonane, n-decane, n-undecane, n-dodecane, n-tridecane and n-tetradecane. Examples of the ketones are acetone and methyl ethyl ketone, examples of the ethers are methyl-t-butyl ether and dibutyl ether, and examples of the esters are ethyl acetate, butyl acetate, methyl lactate, ethyl lactate and butyl lactate. Water is, among others, preferred.

There is no specific limitation to the amount of the liquid to be used if it is possible to ensure that no fusion of the prepolymer particles occur. The crystallized prepolymer may be separated from the liquid by any known method. Then, it may be dried by any known method to yield a crystallized aliphatic polyester prepolymer.

[Step of Solid-Phase Polymerization]

This is a step of subjecting a crystallized aliphatic polyester prepolymer to solid-phase polymerization in the presence of an above-mentioned volatile catalyst.

The conditions for the solid-phase polymerization are not particularly limited if the polymer existing in the reaction system (i.e. the prepolymer and a polyester as its reaction product) remains substantially in a solid state, and if the polyester has less catalyst content than that of the prepolymer, and higher weight-average molecular weight (Mw) than that (Mw) of the prepolymer.

The conditions for the solid-phase polymerization are not particularly limited if the polymer existing in the reaction system (i.e. the prepolymer and a polyester as its reaction product) remains substantially in a solid state, and if the polyester has less catalyst content than that of the prepolymer, if the prepolymer has a weight-average molecular weight ($Mw_1$) falling within the range defined by formula (1), and if the polyester has a weight-average molecular weight ($Mw_2$) falling within the range defined by formulas (2) and (3):

$$2 \times 10^3 \leq Mw_1 \leq 1 \times 10^5 \tag{1}$$

$$5 \times 10^4 \leq Mw_2 \leq 1 \times 10^6 \tag{2}$$

$$Mw_1 < Mw_2 \tag{3}$$

The residual catalyst percentage R [%] as calculated by formula (4) is controlled within the range defined by formula (7). R is preferably not more than 50%, and more preferably not more than 20%.

$$0[\%] \leq R[\%] < 100[\%] \tag{7}$$

wherein R[%] is the residual catalyst percentage [%] calculated by formula (4) as a measure for the difference in catalyst content between before or after solid-phase polymerization;

$$R[\%] = C_A \ [ppm] \div C_B [ppm] \times 100 \tag{4}$$

wherein $C_B$ [ppm] is the theoretical catalyst content of the polyester in the case where all of the catalyst introduced into the reaction system before and/or during solid-phase polymerization remains in the polyester, as calculated by formula (5), and $C_A$ [ppm] is its final catalyst content as calculated by formula (6));

$$C_B \ [ppm] = W_B \ [g] \div W_P \ [g] \times 10^6 \tag{5}$$

(where $W_B$ [g] is the total weight of the catalyst introduced into the reaction system before and/or during solid-phase polymerization, and $W_P$ [g] is the final weight of the polyester);

$$C_A \ [ppm] = W_A \ [g] \div W_P \ [g] \times 10^6 \tag{6}$$

(where $W_A$ [g] is the final weight of the catalyst in the polyester, and $W_P$ [g] is the final weight of the polyester).

The temperature for the solid-phase polymerization reaction is not particularly limited if the polymer in the reaction system (the prepolymer and the polyester as its reaction product) remains substantially in a solid state.

It is, however, generally true that the higher the reaction temperature, the more rapidly the polymerization proceeds, and the more easily the catalyst volatilizes. In order to obtain a polyester having a high molecular weight, therefore, it is advisable to select a reaction temperature from the range between the glass transition temperature (Tg) of the polymer (as defined above) and its melting point (Tm) after taking the volatilizing speed of the catalyst into consideration.

The solid-phase polymerization is preferably carried out in a flowing gas atmosphere so that water produced by polymerization may be removed.

Specific examples of the gas caused to flow through the reaction system are inert gases such as nitrogen, helium, argon, xenon and krypton, and dry air.

The gas preferably has as small the water content as possible, or is substantially free from any water. Gas having a high water content undesirably lowers the rate of polymerization, since it does not remove water formed effectively from the reaction system. Such gas can be dewatered and used if it is passed through a layer of a molecular sieve, or an ion-exchange resin.

The gas preferably has a water content as indicated by a dew point not exceeding −20° C., and more preferably not exceeding −50° C.

The flow rate of the gas is selected by taking into consideration the rate of polymerization, the volatile catalyst and its amount, the speed of volatilization of the catalyst from the polyester during the step of solid-phase polymerization and its efficiency, the speed of removal of water produced by solid-phase polymerization and its efficiency and the ultimate weight-average molecular weight (Mw) of the polyester.

The gas is caused to flow through the reaction system for removing any water produced by solid-phase polymerization therefrom and thereby obtaining an aliphatic polyester having a satisfactorily high weight-average molecular weight.

While a higher flow rate of gas makes it possible to remove water formed more effectively, it causes the catalyst to volatilize more rapidly from the polyester, and if an aliphatic polyester having a high weight-average molecular weight in the order of, say, $5 \times 10^4$ to $1 \times 10^6$ is desired, it is necessary to control the flow rate of gas to a certain level during at least a part of the polycondensation reaction. If such a polyester is desired, it is usually preferable for the gas to have a flow rate of from 0.02 to 200 ml/min., more preferably from 0.3 to 150 ml/min. and still more preferably from 0.5 to 100 ml/min. per gram of the prepolymer.

If its flow rate is lower than 0.02 ml/min. per gram of the prepolymer, the gas can remove water only with far lower efficiency, resulting in the failure to produce a polyester having a high weight-average molecular weight in the order of, say, $5 \times 10^4$ to $1 \times 10^6$. It is preferable for the gas to flow at a linear velocity of 0.01 to 500 cm/sec.

If the solid-phase polymerization is carried out at a reduced pressure, the reaction system may have a reduced pressure not particularly limited if it substantially permits the progress of the polycondensation reaction to yield an aliphatic polyester having a satisfactorily high weight-average molecular weight in the order of, say, $5 \times 10^4$ to $1 \times 10^6$.

Its reduced pressure is selected by taking into consideration the rate of polymerization, the volatile catalyst and its amount, the speed of volatilization of the catalyst from the polyester during the step of solid-phase polymerization and its efficiency, the speed of removal of water produced by solid-phase polymerization and its efficiency and the ultimate weight-average molecular weight (Mw) of the polyester.

If the solid-phase polymerization is carried out at an elevated pressure, the reaction system may have a pressure not particularly limited if it substantially permits the progress of the polycondensation reaction to yield an aliphatic polyester having a satisfactorily high weight-average molecular weight in the order of, say, $5 \times 10^4$ to $1 \times 10^6$.

Its pressure is selected by taking into consideration the rate of polymerization, the volatile catalyst and its amount, the speed of volatilization of the catalyst from the polyester during the step of solid-phase polymerization and its efficiency, the speed of removal of water produced by solid-phase polymerization and its efficiency and the ultimate weight-average molecular weight (Mw) of the polyester. An elevated pressure generally makes the catalyst volatilize less rapidly.

Any method can be employed for lowering the catalyst content of the polyester if it can ensure that its final catalyst content be lower than its theoretical catalyst content in the case where all of the catalyst introduced into the reaction system before and/or during the step of solid-phase polymerization remains in the polyester. It is, for example, possible to lower the catalyst content of the polyester simultaneously with the step of solid-phase polymerization, or if the conditions for the reaction are altered in a multiplicity of stages or continuously, it is possible to lower the catalyst content of the polyester simultaneously with the latter part of the reaction, while not lowering it as far as possible during the former part of the reaction. In order to lower the catalyst content of the polyester to a further extent after its weight-average molecular weight has ceased to increase, it is possible to remove the catalyst, while leaving the reaction conditions as they are.

The following (1) to (4) are the relationships existing generally between the reaction conditions and the volatility of the catalyst:

(1) An elevated reaction pressure makes a volatile catalyst volatilize less easily from an aliphatic polyester;
(2) An elevated reaction temperature makes the catalyst volatilize more easily from the polyester;
(3) A prolonged reaction time makes the catalyst volatilize more easily from the polyester; and
(4) An increased flow rate of gas makes the catalyst volatilize more easily from the polyester.

This invention makes it possible to produce an aliphatic polyester having a high molecular weight and a high level of stability without employing any complicated step for catalyst removal, since it employs a volatile catalyst which volatilizes during the solid-phase polymerization and/or in the same reaction system as that of the solid-phase polymerization thereafter.

[Final Catalyst Content ($C_A$) of the Polyester]

It is generally preferable for the aliphatic polyester formed by solid-phase polymerization to have as low a final catalyst content ($C_A$) as possible in order to be stable for any further processing, and in order for the catalyst not to eluate or bleed out during the use of an article made from the polyester.

When an organic sulfonic acid type compound is used as a volatile catalyst, the residual catalyst content of the polyester and its stability have their relation depending largely on the compound used. It is, therefore, preferable to represent a final catalyst content ($C_A$) by the concentration of the sulfonic acid functional group which is responsible for the catalytic activity of the compound, or the concentration of sulfur.

Thus, it is preferable for the polyester to have a final catalyst content ($C_A$) not exceeding 300 ppm, and more preferably not exceeding 150 ppm, in terms of its sulfur content when the catalyst is an organic sulfonic acid type compound.

[Weight-Average Molecular Weight (Mw) of the Polyester]

The aliphatic polyester according to this invention may have its weight-average molecular weight (Mw) and its molecular weight distribution controlled as desired by selecting the catalyst and its amount and the reaction conditions including reaction pressure, temperature and time, flow rate of gas and the particle diameter of the polyester. The aliphatic polyester according to this invention may have a weight-average molecular weight (Mw) of preferably from about 50,000 to 1,000,000, more preferably from 70,000 to 500,000 and still more preferably from 100,000 to 300,000.

[Polyester Molding and Use]

The aliphatic polyester according to this invention is useful for medical and food wrapping purposes known since before the filing of this application, and as a substitute for common resins.

Its use is not particularly limited, but may include its good application to food containers, industrial fibers and films because of its markedly high molecular weight and its high mechanical properties including tensile strength and elongation.

The processes which can be employed for making molded products of the aliphatic polyester according to this invention are not particularly limited, but specifically include injection molding, extrusion molding, inflation molding, extrusion hollow molding, foam molding, calender molding, blow molding, balloon molding, vacuum molding and spinning.

The polyester can be used to make by appropriate molding processes parts for writing implements such as ballpoint pens, mechanical pencils and pencils, parts for stationery, golf tees, parts for golf balls emitting smoke for the opening of a game, capsules for oral medicines, carriers for suppositories for the anus or vagina, carriers for paste for the skin or mucosa, capsules for agricultural chemicals, fertilizers or seedlings, composts, reels for fishing lines, fishing floats, artificial baits for fishery, lures, buoys for fishery, decoys for hunting, capsules for shots for hunting, camp requisites including tableware, nails, piles, bundling materials, skid-proof materials for muddy or snow-covered roads, blocks, lunch boxes, tableware, containers for box lunchs and dishes sold at convenience stores, chopsticks, splittable chopsticks, forks, spoons, spits, toothpicks, cup-shaped containers for Chinese soup noodles, cups used in drink vending machines, containers or trays for foods including fish, meat, vegetables, soybean curd and side dishes, boxes used in fish markets, bottles for dairy products including milk, yogurt and lactic acid beverages, bottles for soft drinks including carbonated and refreshing drinks, bottles for alcoholic drinks including beer and whisky, bottles with or without pumps for shampoo or liquid soaps, tubes for toothpaste, containers for cosmetics, cleansers or bleaching agents, cooling boxes, flower-pots, casings for water filter cartridges, casings for artificial kidneys or livers, parts for syringes, shock absorbers used for the transportation of domestic electric appliances including televisions and stereos, or precision machines including computers, printers and clocks, or ceramic products including glass and chinaware, etc.

EXAMPLES

The invention will now be described in further detail by examples. It is, however, to be understood that the description of the examples herein is intended for providing a support for the understanding of this invention, and not for limiting the technical scope of this invention.

The following is a description of the methods employed for various kinds of evaluation:

(1) Weight-average Molecular Weight

The weight-average molecular weight (Mw) of the aliphatic polyester as obtained was determined by gel permeation chromatography (GPC with a column temperature of 40° C. and chloroform as a solvent) in comparison with that of a standard sample of polystyrene.

(2) Catalyst (or Sulfur) Content of the Polyester

The catalyst (or sulfur) content of the polyester was determined by ion chromatography. A sample was reduced to ash by heating to 900° C. in Ar and $O_2$ in a closed system and the resulting gas was absorbed by an absorbent (a 1% $H_2O_2$ solution) for examination by ion chromatography. Dionex Ion Chromato DX-300 was used for ion chromatography.

(3) Residual Catalyst Percentage (R)

The residual catalyst percentage (R) was calculated by the formula shown before. The final catalyst content $C_A$ of the polyester was obtained by applying the value of sulfur as determined at (2) above to the organic sulfonic acid employed in each example.

In the following description of the examples, the final catalyst content $C_A$ of the polyester and its theoretical catalyst content $C_B$ occurring if all of the catalyst introduced before and/or during solid-phase polymerization remains in the polyester will appear simply as the catalyst contents $C_A$ and $C_B$, respectively.

(4) Percentage of Weight-average Molecular Weight Retained after Pressing

The percentage of weight-average molecular weight retained after pressing was represented by a ratio of film formed by hot press at 150° C. to that of the polyester before hot press. The film was formed from the polyester after five hours of vacuum drying at 60° C. by heating at a press temperature of 150° C. for four minutes consisting of three minutes of holding and one minute of pressing at a pressure of 10 MPa, and had a thickness of 100 microns.

Example 1

A 500-ml round flask having Dean Stark trap was charged with 118.1 g (1 mol) of succinic acid, 91.0 g (1.01 mol) of 1,4-butanediol and 0.86 g of methanesulfonic acid, and its contents were heated under stirring for nine hours at 150° C. in a nitrogen gas atmosphere and for 0.5 hour at 150° C. and at a pressure of 15 mm Hg, while water formed was removed therefrom by vaporization. There was obtained a reaction product having a weight-average molecular weight of 27,000.

The reaction product was transferred into a separable flask capable of dropping its contents from its bottom and having a heater, and was dropped into water, while it was held at a temperature of 140° C., whereby there was obtained a solidified and crystallized aliphatic polyester prepolymer in the amount of 158.2 g (indicating a yield of 92%).

A part of the prepolymer weighing 60 g was dried in a nitrogen gas atmosphere, and caused to undergo 100 hours of solid-phase polymerization at 100° C. in a stainless steel reactor with nitrogen gas flowing at a rate of 50 ml/min. The nitrogen gas had a dew point of −60° C. Heating was continued for another 30 hours at 105° C. with nitrogen gas flowing at a rate of 6,000 ml/min. for the removal of the catalyst. As a result, there was obtained an aliphatic polyester (polybutylene succinate) in the amount of 57 g (indicating a yield of 95%). Its physical properties were as shown below.

Weight-average molecular weight (Mw): 108,000
Tensile strength: 260 kg/cm$^2$
Tensile elongation: 480%
Catalyst content $C_A$: 420 ppm (sulfur: 140 ppm)
Catalyst content $C_B$: 5,700 ppm
Residual catalyst percentage (R): 7.4%
Percentage of molecular weight retained after pressing: 94%

Example 2

A 500-ml round flask having Dean Stark trap was charged with 118.1 g (1 mol) of succinic acid, 91.0 g (1.01 mol) of 1,4-butanediol and 0.86 g of ethanesulfonic acid, and its contents were heated under stirring for nine hours at 150° C. in a nitrogen gas atmosphere and for 0.5 hour at 150° C. and at a pressure of 15 mm Hg, while water formed was removed therefrom by vaporization. There was obtained a reaction product having a weight-average molecular weight of 26,000.

The reaction product was transferred into a separable flask capable of dropping its contents from its bottom and having a heater, and was dropped into water, while it was held at a temperature of 140° C., whereby there was obtained a solidified and crystallized aliphatic polyester prepolymer in the amount of 157.7 g (indicating a yield of 92%).

A part of the prepolymer weighing 60 g was dried in a nitrogen gas atmosphere, and caused to undergo 100 hours of solid-phase polymerization at 100° C. in a stainless steel reactor with nitrogen gas flowing at a rate of 50 ml/min. The nitrogen gas had a dew point of −60° C. Heating was continued for another 30 hours at 105° C. with nitrogen gas flowing at a rate of 6,000 ml/min. for the removal of the catalyst. As a result, there was obtained an aliphatic polyester (polybutylene succinate) in the amount of 56 g (indicating a yield of 93%). Its physical properties were as shown below.
Weight-average molecular weight (Mw): 103,000
Tensile strength: 250 kg/cm$^2$
Tensile elongation: 480%
Catalyst content $C_A$: 520 ppm (sulfur: 150 ppm)
Catalyst content $C_B$: 5,800 ppm
Residual catalyst percentage (R): 9.0%
Percentage of molecular weight retained after pressing: 93%

Example 3

A 500-ml round flask having Dean Stark trap was charged with 118.1 g (1 mol) of succinic acid, 91.0 g (1.01 mol) of 1,4-butanediol and 0.86 g of 1-propanesulfonic acid, and its contents were heated under stirring for nine hours at 150° C. in a nitrogen gas atmosphere and for 0.5 hour at 150° C. and at a pressure of 15 mm Hg, while water formed was removed therefrom by vaporization. There was obtained a reaction product having a weight-average molecular weight of 26,000.

The reaction product was transferred into a separable flask capable of dropping its contents from its bottom and having a heater, and was dropped into water, while it was held at a temperature of 140° C., whereby there was obtained a solidified and crystallized aliphatic polyester prepolymer in the amount of 157.0 g (indicating a yield of 91%).

A part of the prepolymer weighing 60 g was dried in a nitrogen gas atmosphere, and caused to undergo 100 hours of solid-phase polymerization at 100° C. in a stainless steel reactor with nitrogen gas flowing at a rate of 50 ml/min. The nitrogen gas had a dew point of −60° C. Heating was continued for another 30 hours at 105° C. with nitrogen gas flowing at a rate of 6,000 ml/min. for the removal of the catalyst. As a result, there was obtained an aliphatic polyester (polybutylene succinate) in the amount of 56 g (indicating a yield of 93%). Its physical properties were as shown below.
Weight-average molecular weight (Mw): 103,000
Tensile strength: 250 kg/cm$^2$
Tensile elongation: 480%
Catalyst content $C_A$: 580 ppm (sulfur: 150 ppm)
Catalyst content $C_B$: 5,900 ppm
Residual catalyst percentage (R): 9.8%
Percentage of molecular weight retained after pressing: 93%

Comparative Example 1

A 500-ml round flask having Dean Stark trap was charged with 118.1 g (1 mol) of succinic acid, 91.0 g (1.01 mol) of 1,4-butanediol and 0.86 g of metallic tin, and its contents were heated under stirring for nine hours at 150° C. in a nitrogen gas atmosphere and for 0.5 hour at 150° C. and at a pressure of 15 mm Hg, while water formed was removed therefrom by vaporization. There was obtained a reaction product having a weight-average molecular weight of 24,000.

The reaction product was transferred into a separable flask capable of dropping its contents from its bottom and having a heater, and was dropped into water, while it was held at a temperature of 140° C., whereby there was obtained a solidified and crystallized aliphatic polyester prepolymer in the amount of 157.7 g (indicating a yield of 92%).

A part of the prepolymer weighing 60 g was dried in a nitrogen gas atmosphere, and caused to undergo a total of 130 hours of solid-phase polymerization in a stainless steel reactor, consisting of 100 hours at 100° C. with nitrogen gas flowing at a rate of 50 ml/min. and 30 hours at 105° C. with nitrogen gas at a rate of 6,000 ml/min. There was obtained an aliphatic polyester in the amount of 55 g (indicating a yield of 92%). The nitrogen gas had a dew point of −60° C.

The polymer was dissolved in 500 ml of chloroform, and precipitated with 6,000 ml of acetone. Then, the catalyst was removed by two times of sludge treatment with 500 ml of methyl-tert-butyl ether containing 0.5% by weight of hydrochloric acid and filtration. Finally, the polymer was washed with 1,000 ml of methyl-tert-butyl ether, and dried to yield an aliphatic polyester (polybutylene succinate) in the amount of 52 g (indicating a yield of 87%). Its physical properties were as shown below. Its catalyst (tin) content was determined by fluorescent X-ray analysis.
Weight-average molecular weight (Mw): 98,000
Tensile strength: 230 kg/cm$^2$
Tensile elongation: 470%
Catalyst (tin) content $C_A$: 5,900 ppm
Catalyst (tin) content $C_A$: 5,900 ppm
Residual catalyst percentage (R): 100%
Tin content after catalyst removal: 20 ppm
Percentage of molecular weight retained after pressing: 93%

Comparative Example 2

A 500-ml round flask having Dean Stark trap was charged with 118.1 g (1 mol) of succinic acid, 91.0 g (1.01 mol) of 1,4-butanediol and 0.86 g of metallic tin, and its contents were heated under stirring for nine hours at 150° C. in a nitrogen gas atmosphere and for 0.5 hour at 150° C. and at a pressure of 15 mm Hg, while water formed was removed therefrom by vaporization. There was obtained a reaction product having a weight-average molecular weight of 24,000.

The reaction product was transferred into a separable flask capable of dropping its contents from its bottom and having a heater, and was dropped into water, while it was held at a temperature of 140° C., whereby there was obtained a solidified and crystallized aliphatic polyester prepolymer in the amount of 157.7 g (indicating a yield of 92%).

A part of the prepolymer weighing 60 g was dried in a nitrogen gas atmosphere, and caused to undergo a total of 130 hours of solid-phase polymerization in a stainless steel reactor, consisting of 100 hours at 100° C. with nitrogen gas flowing at a rate of 50 ml/min. and 30 hours at 105° C. with nitrogen gas at a rate of 6,000 ml/min. There was obtained an aliphatic polyester in the amount of 55 g (indicating a yield of 92%). The nitrogen gas had a dew point of −60° C.

The physical properties of the polyester were as shown below. Its catalyst (tin) content was determined by X-ray fluorescence.
Weight-average molecular weight (Mw): 98,000
Catalyst (tin) content $C_A$: 5,900 ppm
Catalyst (tin) content $C_B$: 5, 900 ppm
Residual catalyst percentage (R): 100%
Percentage of molecular weight retained after pressing: 30%

Advantages of the Invention

The process of this invention is more efficient than any prior process calling for a complicated step of catalyst removal, since it employs a volatile catalyst which can be removed during the solid-phase polymerization and/or in the same reaction system as that of the solid-phase polymerization thereafter. Thus, the aliphatic polyester having a high molecular weight as obtained by this invention is comparable in stability to the known polyester from which the catalyst has been removed. Moreover, the process of this invention makes it possible to improve the volume efficiency of the equipment and thereby lower the cost thereof, as compared with the process in which the polycondensation reaction is carried out in an organic solvent.

What is claimed is:

1. A process for preparing an aliphatic polyester, wherein a crystallized aliphatic polyester prepolymer formed consisting essentially of an aliphatic dihydric alcohol and an aliphatic dicarboxylic acid and having a weight-average molecular weight ($Mw_1$) falling within the range defined by a formula (1) is caused to undergo solid-phase polymerization in the presence of a volatile catalyst to make an aliphatic polyester having a weight-average molecular weight ($Mw_2$) falling within the range defined by formulas (2) and (3):

$$2\times10^3 \leq Mw_1 \leq 1\times10^5 \quad (1)$$

$$5\times10^4 \leq Mw_2 \leq 1\times10^6 \quad (2)$$

$$Mw_1 < Mw_2 \quad (3).$$

2. A process for preparing an aliphatic polyester according to claim 1, wherein the residual catalyst percentage R, as defined by a formula (4), is 50% or below:

$$R[\%]=C_A[ppm]\div C_B[ppm]\times 100 \quad (4)$$

wherein R is the residual catalyst percentage [%] as a measure for the difference in catalyst content between before and after the solid-phase polymerization, $C_B$ [ppm] is the theoretical catalyst content in the aliphatic polyester in the case where all of the catalyst introduced into the reaction system before and/or during solid-phase polymerization remains in the aliphatic polyester, as calculated by a formula (5), and $C_A$ [ppm] is a final catalyst content in the aliphatic polyester as calculated by a formula (6);

$$C_B[ppm]=W_B[g]\div W_P[g]\times 10^6 \quad (5)$$

wherein $W_B$ [g] is the total weight of the catalyst introduced into the reaction system before and/or during solid-phase polymerization, and $W_P$ [g] is the final weight of the aliphatic polyester;

$$C_A[ppm]=W_A[g]\div W_P[g]\times 10^6 \quad (6)$$

wherein $W_A$ [g] is the final weight of the catalyst in the aliphatic polyester, and $W_P$ [g] is the final weight of the aliphatic polyester.

3. A process for preparing an aliphatic polyester according to claim 2, wherein the aliphatic polyester prepolymer is a polybutylene succinate prepolymer formed from succinic acid and 1,4-butanediol, and the aliphatic polyester is polybutylene succinate.

4. A process for preparing an aliphatic polyester according to claim 2, wherein the volatile catalyst is an organic sulfonic acid.

5. A process for preparing an aliphatic polyester according to claim 4, wherein the organic sulfonic acid is at least one compound selected from the group consisting of methanesulfonic, ethanesulfonic, 1-propanesulfonic, benzenesulfonic, p-chlorobenzenesulfonic, and m-xylene-4-sulfonic acids.

6. A process for preparing an aliphatic polyester according to claim 5, wherein the final catalyst content of the aliphatic polyester is from 0 to 300 ppm in terms of the sulfur content.

7. A process for preparing an aliphatic polyester, comprising the steps of:

(A) forming an aliphatic polyester prepolymer having a weight-average molecular weight ($Mw_1$) falling within the range defined by a formula (1), by polycondensation consisting essentially of an aliphatic dihydric alcohol and an aliphatic dicarboxylic acid in the presence or absence of a catalyst and in the presence or absence of a solvent, $$2\times10^3 \leq Mw_1 \leq 1\times10^5 \quad (1);$$

(B) crystallizing the aliphatic polyester prepolymer as obtained by step (A); and (C) causing the aliphatic polyester prepolymer as crystallized by step (B) to undergo solid-phase polymerization in the presence of a volatile catalyst to make an aliphatic polyester having a weight-average molecular weight ($MW_2$) falling within the range defined by formulas (2) and (3), $$5\times10^4 \leq Mw_2 \leq 1\times10^6 \quad (2)$$

$$Mw_1 < Mw_2 \quad (3).$$

8. A process for preparing an aliphatic polyester according to claim 7, wherein the aliphatic dihydric alcohol is 1,4-butanediol, the aliphatic dicarboxylic acid is succinic acid, and the volatile catalyst comprises at least one compound selected from the group consisting of methanesulfonic, ethanesulfonic, 1-propanesulfonic, benzenesulfonic, p-chlorobenzenesulfonic, and m-xylene-4-sulfonic acids.

9. A process for preparing an aliphatic polyester according to claim 1, wherein the aliphatic polyester prepolymer is a polybutylene succinate prepolymer formed from succinic acid and 1,4-butanediol, and the aliphatic polyester is polybutylene succinate.

10. A process for preparing an aliphatic polyester according to claim 1, wherein the volatile catalyst is an organic sulfonic acid.

11. A process for preparing an aliphatic polyester according to claim 10, wherein the organic sulfonic acid is at least one compound selected from the group consisting of methanesulfonic, ethanesulfonic, 1-propanesulfonic, benzenesulfonic, p-chlorobenzenesulfonic, and m-xylene-4-sulfonic acids.

12. A process for preparing an aliphatic polyester according to claim 11, wherein the final catalyst content of the aliphatic polyester is from 0 to 300 ppm in terms of the sulfur content.

13. A process for preparing an aliphatic polyester according to claim 10, wherein the final catalyst content of the aliphatic polyester is from 0 to 300 ppm in terms of the sulfur content.

14. A process for preparing an aliphatic polyester according to claim 4, wherein the final catalyst content of the aliphatic polyester is from 0 to 300 ppm in terms of the sulfur content.

* * * * *